Figure 3:
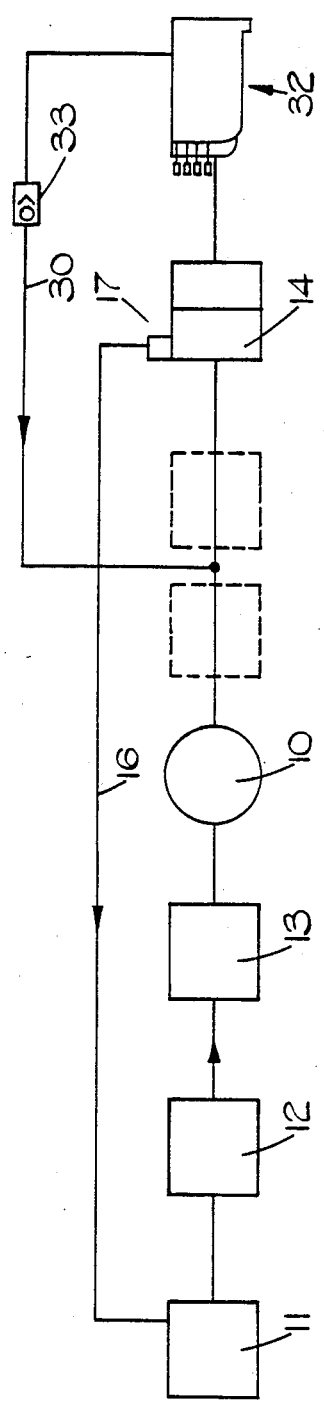

United States Patent [19]

Bartlett et al.

[11] Patent Number: 4,625,701
[45] Date of Patent: Dec. 2, 1986

[54] FUEL SYSTEM

[75] Inventors: Peter J. Bartlett, Castle Hedingham; Peter F. Bradford, Sudbury, both of England

[73] Assignee: Lucas Industries public limited company, Birmingham, England

[21] Appl. No.: 701,210

[22] Filed: Feb. 13, 1985

[30] Foreign Application Priority Data

Mar. 9, 1984 [GB] United Kingdom ............... 8406270

[51] Int. Cl.⁴ ............................................ F02M 39/00
[52] U.S. Cl. .................... 123/514; 123/510; 123/516; 123/557
[58] Field of Search ............... 123/514, 510, 511, 516, 123/518, 557

[56] References Cited

U.S. PATENT DOCUMENTS

| | | | |
|---|---|---|---|
| 2,222,274 | 11/1940 | Atonsen | 123/516 |
| 2,917,110 | 12/1959 | Brohl | 123/516 |
| 4,187,813 | 2/1980 | Stumpp | 123/510 |
| 4,296,723 | 10/1981 | Aldrich | 123/514 |
| 4,377,149 | 3/1983 | Naylor | 123/510 |
| 4,411,239 | 10/1983 | Kelch | 123/514 |
| 4,411,240 | 10/1983 | Kravetz | 123/557 |
| 4,413,604 | 11/1983 | Tune | 123/514 |
| 4,440,138 | 4/1984 | Smith | 123/514 |
| 4,454,851 | 6/1984 | Bourbonnaud | 123/514 |
| 4,478,197 | 10/1984 | Yasuhara | 123/510 |

FOREIGN PATENT DOCUMENTS 2031994 4/1980 United Kingdom ............... 123/511

Primary Examiner—Carl Stuart Miller

[57] ABSTRACT

A fuel system for a compression ignition engine includes a high pressure pump to which fuel is supplied through a filter by a low pressure pump. A fuel heater is provided to supply heat to the fuel. Fuel is returned from the housing of the high pressure pump through a conduit which includes in a valve housing a restricted orifice. The valve housing also includes temperature responsive means which when the fuel temperature is low reduces the size of the orifice.

11 Claims, 5 Drawing Figures

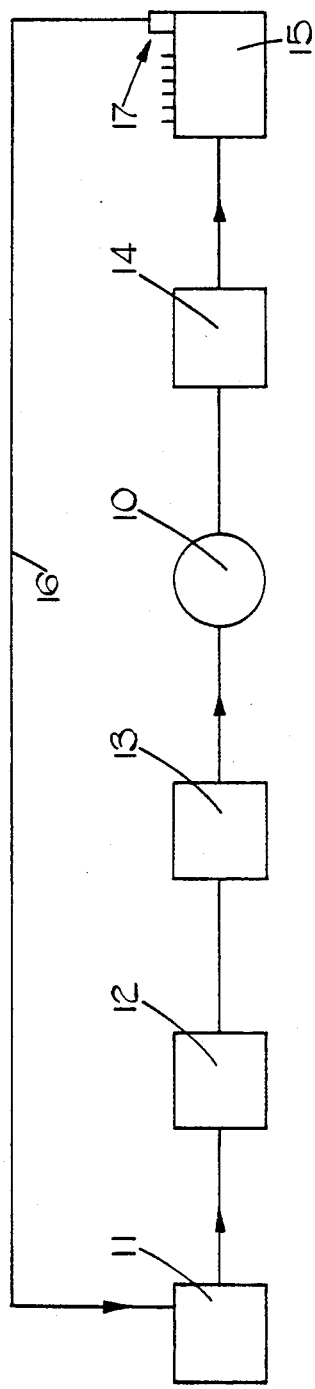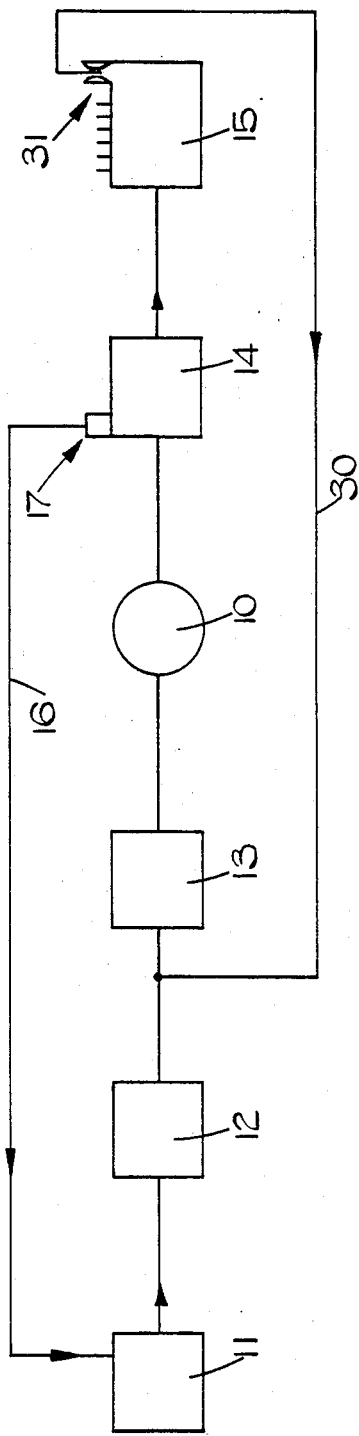

FUEL SYSTEM

This invention relates to a fuel supply system for a compression ignition engine, the system comprising a low pressure pump which draws fuel from a supply tank, a high pressure pump which is supplied with fuel by the low pressure pump, a filter disposed intermediate the low and high pressure pumps and a fuel heater for heating the fuel flowing to the filter.

The use of a fuel heater in the fuel system set out above has been generally confined to the winter months when there is a danger that fractions of the fuel will freeze and be precipitated in the remaining liquid fuel. As the fuel is drawn through the filter the frozen fractions will be retained by the filter and will clog the filter and thereby prevent further supply of fuel. When the ambient temperature is such that there is a possibility of the fuel freezing the heater is brought into operation to add sufficient heat to the fuel to prevent freezing.

It is usual to supply a different formulation of fuel for use in cold conditions, this formulation of fuel being such that freezing takes place at a much lower temperature. As the world supply of fuel diminishes, there will be an increasing tendency to supply fuels which contain fractions which may freeze at normal ambient temperatures. This is because of the use of higher melting point hydrocarbons in the fuel, makes the best use of the diminishing resources of fuel. Fuel systems which are designed to use such fuels will require the heater to be used more frequently but at high ambient temperatures the high pressure pump may require to be cooled to maintain its efficiency. With all the systems it is necessary to allow air entrained with the fuel to be vented this being achieved by returning the fuel containing the air to the fuel tank.

The object of the invention is to provide a fuel system of the kind specified in a simple and convenient form.

According to the invention a fuel system of the kind specified comprises a fuel return conduit extending from the filter housing or the high pressure pump housing, an orifice in said conduit and temperature responsive means operable when the temperature of the fuel flowing through said orifice falls or is below a predetermined value, to reduce the size of the orifice.

Figure 5:
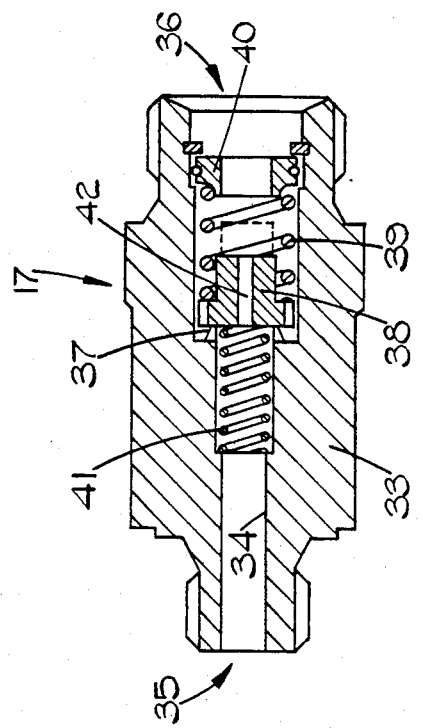
Figure 4:
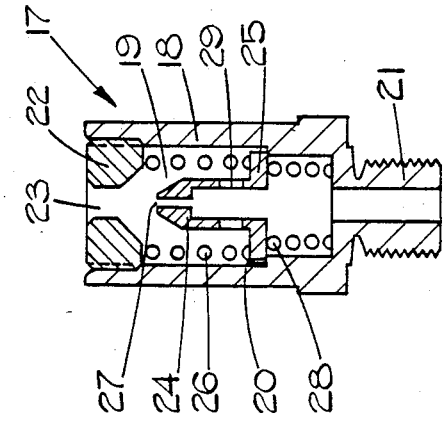

In the accompanying drawings:

FIGS. 1-3 are diagrammatic views of different fuel systems in accordance with the invention, FIG. 4 is a sectional side elevation of one example of a valve incorporated in the systems, and FIG. 5 is a view similar to FIG. 4 showing a further example of the valve.

Referring to FIG. 1 of the drawings the fuel system comprises a low pressure pump 10 which draws fuel from a supply tank 11, the fuel flowing by way of sedimentation unit 12 and a fuel heater 13. The pump 10 supplies fuel by way of a fine filter 14 to a high pressure pump 15 which has outlets which are connected to the injection nozzles of the associated engine respectively. The heater 13 is an electrical heater which includes a thermostat whereby the heater is de-energised when the fuel within or leaving the heater attains a predetermined temperature. As an alternative the heater may be a water/fuel heat exchanger which is supplied with water from the engine cooling system. The sedimentation unit 12 is a device in which coarse particles of dirt and also droplets of water contained in the fuel drawn from the supply tank, can fall out of the fuel so that reasonably clean fuel is drawn by the pump 10 and supplied to the filter 14. The filter 14 is a paper filter which is able to retain particles down to a very small size so that no damage can occur to the high pressure fuel injection pump.

The heater 13 heats the fuel sufficiently to avoid fractions of the fuel freezing and thereby clogging the filter 14 and as mentioned above, the heater is turned off when the temperature of fuel rises above a predetermined value.

The high pressure pump 15 includes a vent and this is connected by way of a return conduit 16 to the fuel tank. The vent permits any fuel which has leaked into the housing of the high pressure pump, to be returned to the tank although for cooling and venting purposes, some bleeding of the fuel directly from the fuel inlet of the high pressure pump may be allowed. In order to economise on the amount of heat which has to be added to the fuel, a valve 17 is provided and this is conveniently disposed on the housing of the high pressure pump. An enlarged view of the valve is seen in FIG. 4 and an alternative form of the valve is seen in FIG. 5.

Referring to FIG. 4 the valve comprises a valve housing 18 defining a valve chamber 19. A step 20 is defined in the chamber and at one end the housing forms a threaded union 21 whereby the housing can be screwed into the housing of the pump 15. At its other end the chamber is closed by a valve plate 22 which defines an orifice 23. Mounted in the chamber is a valve member 24 which is provided with an outwardly directed flange 25 against which is engaged one end of a coiled compression spring 26 the other end of which engages the valve plate. The spring 26 therefore acts to urge the flange 25 against the step 20. The valve member is of tubular form and defines at its end presented towards the valve plate, an orifice 27 which is smaller than the orifice 23. In addition, the valve member at this end is shaped to engage with the valve plate 22 at the entrance to the orifice 23, the effect of engagement being to increase the degree of restriction to flow of fuel through the valve. The valve member is moved into contact with the valve plate by the action of a temperature responsive spring 28 one end of which bears against the flange 25 and the other end of which bears against a further step defined in the valve chamber. The spring is immersed in the fuel flowing from the high pressure pump. In the position in which the valve is shown in FIG. 4, the fuel temperature is high so that the temperature responsive spring 28 has collapsed allowing the spring 26 to move the flange of the valve member into contact with the step. In this situation fuel flows by way of by-pass apertures 29 formed in the valve member and through the orifice 23 to the return conduit 16. When the fuel temperature is below a predetermined value, the spring 28 is in an expanded state in which the valve member engages the valve plate so that the orifice 23 is blocked. In this condition the quantity of fuel returned to the fuel tank is reduced. The temperature at which the valve moves to its more restricted position, is chosen to be higher than the setting of the thermostat in the heater 13 and at which the heater is de-energised.

Under cold conditions therefore the valve 17 will offer substantial restriction to the flow of fuel so that only a small quantity of fuel will flow through the return conduit 16. The heater 13 will be energised and warm fuel will pass through the pump 10 and the filter 14 to the high pressure pump. As the temperature increases the thermostat of the heater will de-energise the heater and as the temperature of the fuel further increases leading to an increase of the temperature of the fuel in the high pressure pump 15, the valve member 24 will move to the position in which it is shown in FIG. 4 to allow an increased flow of fuel through the conduit 16. This increased flow of fuel acts to cool the high pressure pump 15.

The alternative form of the valve 17 seen in FIG. 5 includes a valve housing 33 which has a central stepped bore 34 and an outlet 36. Intermediate the ends of the bore is defined a seating 37 with which can co-operate a valve member 38 which is slidably accommodated within a valve chamber defined by the wider portion of the bore extending between the seating and the outlet 36. The valve member is biased into contact with the seating by a temperature responsive spring 39, the end of the spring remote from the valve member engaging an apertured spring abutment 40 which is retained in the wider portion of the bore by means of a circlip.

The valve member 38 is biased in a direction away from the seating by a coiled compression spring 41. Moreover, the valve member is provided with a central passage 42 which is of a restricted nature and which forms the equivalent of the orifice 27 of the valve of FIG. 4. When the fuel is cold the spring 39 occupies the extended position as shown in FIG. 5 but when the fuel is hot the spring 41 urges the valve member from the seating to allow fuel flow around the valve member, the latter being fluted for this purpose. The valve member can move to the position shown in dotted outline under the action of the spring 41 this position being determined by the fuel temperature and the spring rates of the two springs.

Referring now to FIG. 2, parts which have the same function as those of FIG. 1 are assigned the same reference numerals. In the example of FIG. 2, the return conduit 16 is connected by way of the valve 17 to the upper portion of the housing of the filter 14. In addition, a further conduit 30 is provided which connects the housing 15 of the high pressure pump with a point in the supply line intermediate the sedimentation unit and the heater 13. The conduit 30 includes a restricted orifice 31 which is conveniently located in a housing secured to the pump housing. In operation, and assuming that the ambient temperature is low, the valve 17 assumes its setting to restrict the flow of fuel. The heater 13 is energised and the heated fuel is supplied by way of the filter 14 to the high pressure pump. Some of the fuel returns to the supply tank by way of the conduit 16 and some fuel flows by way of the conduit 30 to the inlet of the heater. The fuel which flows along the conduit 16 will have entrained with it any air which may have accumulated in the filter housing. The fuel which is returned by way of the conduit 30 will be at a higher temperature than the fuel which is supplied to the high pressure pump. The reason for this is that work is done on the fuel in the high pressure pump and also because the high pressure pump is located adjacent the engine, the fuel flowing through it will become heated. As the temperature of the fuel which is supplied to the heater increases a point will be reached at which the thermostat of the heater opens to de-energise the heater and this will remain in a de-energised state so long as the fuel is sufficiently warm. If the ambient temperature increases a value of temperature will be reached at which the spring 28 collapses thereby allowing an increased flow of fuel along the conduit 16 This increased flow of fuel is made up by an increased flow of cooler fuel from the tank 11 and the practical effect is that some of the hot fuel flowing along the conduit 30 flows along the conduit 16 so that the temperature of the fuel supplied to the high pressure pump 15 will decrease.

Turning now to FIG. 3 there is shown a system for supplying fuel to a rotary distributor type of pump 32. The system is basically the same as the system shown in FIG. 2 with the exception that the restrictor 31 is replaced by a non-return valve 33 which is able to allow fuel to flow from the housing of the pump 32 back into the fuel supply line. Conveniently the point of re-entry into the fuel supply line is intermediate the pump 10 and the filter 14. The reason for this is that variations in the pressure within the housing of the pump can influence the operation of certain components within the pump. It is desirable to maintain the pressure in the housing of the pump at a small positive value and this is achieved using the valve 33. It is however desirable that the pressure downstream of the valve 33 should be kept as constant as possible since this also will influence the pressure in the pump housing. The conduit 30 is therefore connected to the outlet of the pump 10. In FIG. 3 it will be noted that alternative positions for the heater 13 are shown in dotted outline and there is no reason why the heaters 13 shown in the examples of FIGS. 1 and 2 should not be positioned upstream of the pump 10.

By the arrangement described air entrained in the fuel is returned to the fuel tank, in the case of the examples of FIG. 1 directly through the valve 17 whatever its setting from the fuel pump and in the case of the example of FIGS. 2 and 3, through the valve 17 from the filter housing. Moreover, the flow of fuel through the heater when the fuel is cold, is kept to a minimum so that the rating of the heater particularly when the heater is electrically powered can be kept low.

We claim:

1. A fuel supply system for a compression ignition engine comprising a low pressure pump having an inlet connected to a fuel supply tank, a high pressure fuel pump including a housing, a fuel filter connected between an outlet of the low pressure pump and an inlet of the high pressure pump, a fuel heater for heating fuel flowing to the filter, a fuel return conduit extending from the housing of the high pressure pump to said supply tank, and temperature responsive means in said return conduit responsive to the temperature of fuel flowing in said fuel return conduit, said temperature responsive means acting to restrict the flow of fuel in said fuel return conduit when the temperature of the fuel flowing in said fuel return conduit is below a predetermined value and comprising a valve housing defining a valve chamber, said valve chamber forming part of said conduit, a valve member movable in said chamber, a temperature responsive spring acting on said valve member, the valve member and spring being arranged so that when the fuel flowing in said chamber is cold, the valve member will be moved in said chamber to restrict the fuel flow through the chamber.

2. A fuel supply system for a compression ignition engine comprising a low pressure pump having an inlet connected to a fuel supply tank, a high pressure pump including a housing, a fuel filter having a casing and connected between an outlet of the low pressure pump and an inlet of the high pressure pump, a fuel heater for heating fuel flowing to the filter, a first fuel return conduit extending from the casing of the filter to said supply tank, a second fuel return conduit extending from the housing of the high pressure pump to a position upstream of the inlet of the low pressure pump, means for restricting the flow of fuel in said second fuel return conduit, and temperature resposive means in said first fuel return conduit responsive to the temperature of the fuel flowing in said first fuel return conduit, said temperature responsive means acting to restrict the flow of fuel in said first fuel return conduit when the temperature of the fuel flowing in said first fuel return conduit is below a predetermined value.

3. A fuel supply system according to claim 2 in which said heater is disposed upstream of the low pressure pump and said second conduit extends to a position upstream of said heater.

4. A fuel supply system for a compression ignition engine comprising a low pressure pump having an inlet connected to a fuel supply tank, a rotary distributor fuel supply pump including a housing, a fuel filter having a casing and connected between an outlet of the low pressure pump and an inlet of the rotary distributor pump, a fuel heater for heating fuel flowing to the filter, a first fuel return conduit extending from the casing of the filter to said supply tank, a second fuel return conduit extending from the housing of the rotary distributor fuel supply pump to the outlet of the low pressure pump, a non-return valve in said second fuel return conduit said non-return valve acting to maintain the pressure in said housing at a value which is slightly higher than the pressure at the outlet of the low pressure pump, and temperature responsive means in said first fuel return conduit responsive to the temperature of the fuel flowing in said first fuel return conduit, said temperature responsive means acting to restrict the flow of fuel in said first fuel return conduit when the temperature of the fuel flowing in said first fuel return conduit is below a predetermined value.

5. A system according to any one of claim 2 or 4 in which said temperature responsive means comprises a valve housing defining a valve chamber, said valve chamber forming part of said conduit, a valve member movable in said chamber, a temperature responsive spring acting on said valve member, the valve member and spring being arranged so that when the fuel flowing in said chamber is cold, the valve member will be moved in said chamber to restrict the fuel flow through the chamber.

6. A system according to claim 5 including a plate serving to close one end of said chamber, an orifice being formed in said plate, said valve member being of tubular form and being shaped at one end for engagement with the entrance to said orifice under the action of said spring when the fuel is cold, the valve member defining a further orifice more restricted than the first mentioned orifice and and through which fuel flows when it is cold.

7. A system according to claim 6 including a flange on the valve member, said spring acting against said flange in a direction to urge the valve member into contact with said plate and a coiled compression spring acting on said flange to urge the valve member away from said plate.

8. A system according to claim 7 including a step defined in said valve housing, the step co-operating with the flange to limit the movement of the valve member under the action of the coiled compression spring.

9. A system according to claim 8 in which said further orifice is formed in said one end of the valve member, the wall of the valve member being provided with apertures through which fuel can flow when said flange is in contact with the step.

10. A system according to claim 5 including a seating defined in said valve chamber, said temperature responsive spring acting to urge the valve member into contact with said seating, and an aperture formed in said valve member and through which fuel can flow at a restricted rate when the valve member is in contact with the seating.

11. A system according to claim 10 including a coiled compression spring acting to urge the valve member away from said seating.

* * * * *